United States Patent [19]
Destame

[11] 3,938,186
[45] Feb. 10, 1976

[54] APPARATUS FOR CONVERTING VISUALLY LEGIBLE NUMERICAL CHARACTERS INTO A BINARY CODE

[75] Inventor: Daniel Paul Henri Destame, Anes-Dreux, France

[73] Assignee: U.S. Philips Corporation, New York, N.Y.

[22] Filed: Dec. 13, 1974

[21] Appl. No.: 532,512

Related U.S. Application Data

[63] Continuation of Ser. No. 388,254, Aug. 14, 1973, abandoned.

[30] Foreign Application Priority Data
Sept. 18, 1972 France .......................... 72.32975

[52] U.S. Cl. ......................................... 340/146.3 Z
[51] Int. Cl.² ......................................... G06K 9/18
[58] Field of Search ............. 340/146.3 A, 146.3 Z, 146.3 H

[56] References Cited
UNITED STATES PATENTS

| | | | |
|---|---|---|---|
| 2,000,403 | 5/1935 | Maul | 340/146.3 Z |
| 3,058,093 | 10/1962 | Vernon et al. | 340/146.3 Z |
| 3,200,373 | 8/1965 | Rabinow | 340/146.3 H |
| 3,257,545 | 6/1966 | VanBerkel et al. | 340/146.3 Z |
| 3,559,170 | 1/1971 | Barnes | 340/146.3 Z |
| 3,596,249 | 7/1971 | Tierney | 340/146.3 Z |
| 3,699,518 | 10/1972 | Greenough et al. | 340/146.3 Z |

*Primary Examiner*—Leo H. Boudreau
*Attorney, Agent, or Firm*—Frank R. Trifari; Daniel R. McGlynn

[57] ABSTRACT

Apparatus for converting visually legible digits or groups of digits into a binary code. For each digit four recognition areas together with the shape of the digit supply directly, without the use of a decoder, the information which represents the binary value of each digit. The apparatus may be used in electronic data processing.

2 Claims, 4 Drawing Figures

1234567890
Fig. 1
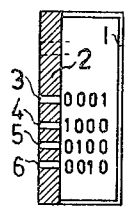
Fig. 2
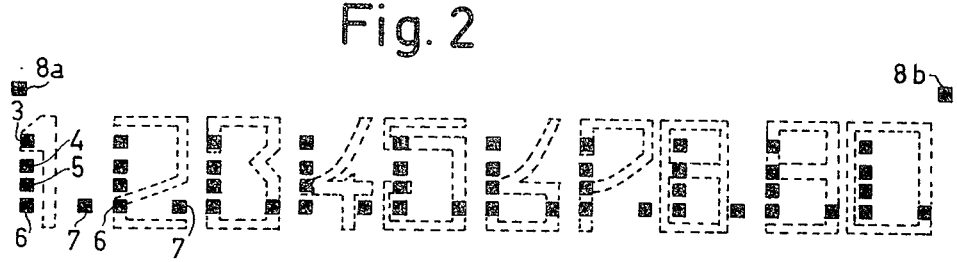
Fig. 3
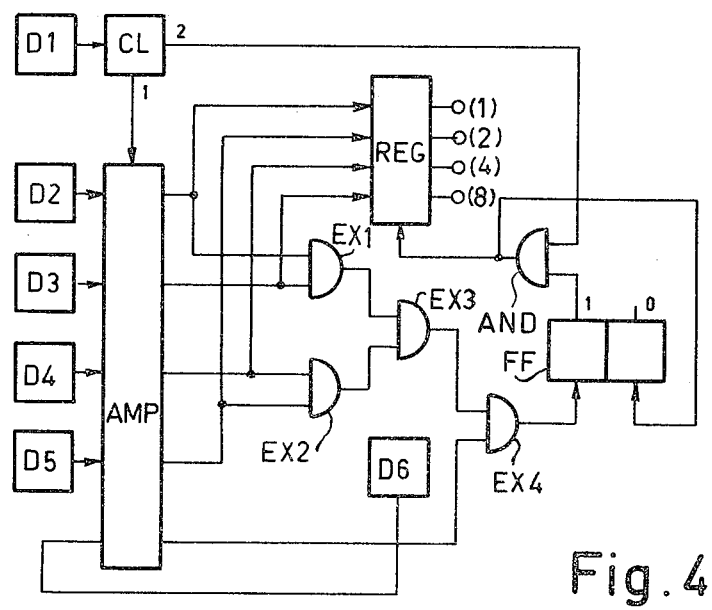
Fig. 4

APPARATUS FOR CONVERTING VISUALLY LEGIBLE NUMERICAL CHARACTERS INTO A BINARY CODE

This is a continuation of application Ser. No. 388,254, filed Aug. 14, 1973, now abandoned.

The invention relates to an apparatus for converting a visually legible numerical character present within a character format area on a support into a binary code, which apparatus contains a plurality of sensing elements each capable of deriving from a predetermined area of the character format area a binary information element, from which binary information elements the value of the numerical character can be determined. The sensing elements may sense optical, magnetic or other signals from predetermined areas.

Such an apparatus is described in French Pat. No. 1,335,739. The system described uses six areas three of which lie outside the character format area. The shape of a character and the situations of the three areas within the character format area are such that each character is identified as a three-out-of-six code.

Such a system has disadvantages. Firstly the areas outside the character format area occupy additional space. Secondly the characters must include printed elements (black marks) according to their identity, and this reduces legibility. Finally the three-out-of-six code must be converted into a binary code by a complicated decoder.

It is an object of the present invention to provide a simple reading apparatus for small-size characters. For this purpose the invention is characterized in that per numerical character the sensing elements derive a binary information element from each of four areas so arranged in a predetermined sequence in the format area of the numerical character of such shape that the output signals from the sensing elements according to the said sequence provide a binary-value code of the numerical character. The term "binary code" is used herein to mean the conventional binary code and codes derived therefrom, such as the excess-three code and the like; such codes are suitable for use in arithmetic operations in a calculating unit. In addition, the number of sensing elements is a minimum and no decoder is required.

It is an advantageous aspect of the invention that per numerical character a fifth sensing element can derive a fifth binary information element from a fifth area within the character format, the location of the fifth area and the shape of the numerical character together providing a parity-determining binary information signal. Thus a parity check may simply be made.

An embodiment of an apparatus according to the invention will now be described by way of example with reference to the accompanying diagrammatic drawings, in which:

FIG. 1 shows the shape of the type characters to be used according to the invention, FIG. 2 is a sectional view of a sensing head comprising four channels and the various weights assigned thereto, FIG. 3 shows with respect to the characters of FIG. 1 the disposition of the recognition areas with the associated values, the parity area and two centering areas, FIG. 4 is a block schematic diagram of the recognition section of an apparatus according to the invention.

In FIG. 1 the ten decimal digits are shaped so that the human eye can readily identify them and that four aligned sensing elements when aimed at a vertical section directly furnish the binary value of each digit.

In FIG. 2 a reading head 1 comprising a plate 2 which is to be applied to the character to be read and in which four reading channels 3, 4, 5 and 6 are formed which may be provided with photoelectric cells (not shown). Relative to each channel the assigned binary weight is indicated.

FIG. 3 shows for each of the ten decimal characters of FIG. 1 the disposition of each of the value recognition areas 3, 4, 5 and 6 which correspond to the reading channels of FIG. 2; an imparity recognition area 7 is disposed to the right of the recognition area 6.

Two alignment areas 8a and 8b are located outside the characters to ensure correct register of the reading head with the recognition areas of each character.

If, for example, the digits are printed in black on a white background and the reading cells deliver a high voltage level when they face a black area, the following Table is obtained.

| Areas | 4 | 5 | 6 | 3 | 7 | Imparity |
|---|---|---|---|---|---|---|
| Digits 1 | 0 | 0 | 0 | 1 | 0 | 1 |
| 2 | 0 | 0 | 1 | 0 | 0 | 1 |
| 3 | 0 | 0 | 1 | 1 | 1 | 3 |
| 4 | 0 | 1 | 0 | 0 | 0 | 1 |
| 5 | 0 | 1 | 0 | 1 | 1 | 3 |
| 6 | 0 | 1 | 1 | 0 | 1 | 3 |
| 7 | 0 | 1 | 1 | 1 | 0 | 3 |
| 8 | 1 | 0 | 0 | 0 | 0 | 1 |
| 9 | 1 | 0 | 0 | 1 | 1 | 3 |
| 0 | 0 | 0 | 0 | 0 | 1 | 1 |

As will be seen, the channels 3, 4, 5 and 6 of the reading head 1 directly supply the binary value of each digit.

For the zero none of the said four channels supplies any information; in order to avoid the possibility of an error due to this fact, for example, in the case of a faulty cell, a fifth area 7, an imparity area, is associated with each character and provides a single information about the zero and a second information about the digits 3, 5, 6 and 9. This second information enables the operation of the cells to be checked in known manner, because the sum total of the bits of information supplied for each digit must always be odd (1 or 3).

Reading a number is effected in this particular embodiment by means of a reading head which comprises as many groups of five cells each as there are digits to be read, permitting all the digits of the number to be read simultaneously.

The registration of the reading head with the number to be read must be highly accurate and therefore two cells (not shown) are located at the left-hand and the right-hand ends respectively of the head, no reading being possible unless these two cells are in accurate register with the two alignment areas 8a and 8b situated to the left and to the right respectively of the number to be read.

In the embodiment described the areas 3, 4, 5 and 6 are vertically aligned; obviously, another disposition may be used in combination with a different shape of the characters, provided that the conditions of visual legibility and direct binary evaluation are fulfilled.

The system according to the invention may also be used when the characters are printed on a support in magnetic ink; in this case the reading head comprises magnetic sensing elements instead of photocells.

FIG. 4 is a block schematic diagram of the recognition section of an apparatus according to the invention which comprises six detectors D1 . . . D6, a clock CL, an amplifier AMP, four logic exclusive — OR gates EX1 . . . EX4, a flipflop FF, a logic AND gate AND and an output register REG. The detectors D2 . . . D6 are located so as to be capable of simultaneously detecting the information from the five areas shown in FIG. 3. The detector D1 can detect the information from a centering area, for example the area shown in FIG. 3 at the extreme left-hand end. In this embodiment, it is now assumed that the detector assembly (FIG. 2) moves along the row of characters from left to right. When the detector D1 detects a centering area, it delivers a signal to the clock which starts delivering clock pulses at a frequency which corresponds to the spacing between the character format areas of FIGS. 1 and 3 and to the travelling speed of the detector assembly. Each clock pulse comprises two signal pulses which appear with a very short interval at the outputs 1 and 2 respectively of the clock CL. The pulse at the output terminal 1 of the clock causes the amplifier AMP to become operative so that the signals from the five detectors D2 . . . D6 are transmitted in amplified form. The information from the detectors D3, D4, D5 and D2 is transferred in this sequence to the output register REG and stored in the form of binary information elements. The information from the detectors D2 and D3 is supplied to the logic exclusive-OR gate EX1. Such gates are known and deliver a logic "1" if one but not more than one of the input signals is a logic "1". This also applies to the gates EX2 and EX3, so that the logic gate EX3 delivers a "1" only if one or three of the detectors D2 . . . D5 delivers or deliver a logic "1". The logic exclusive-OR gate EX4 delivers a logic "1" if one (digits 0, 1, 2, 4, 8) or three (digits 3, 5, 6, 7, 9) of the detectors D2 . . . D5 delivers or deliver a logic "1". When all five detectors deliver a logic "1" the exclusive-OR gate EX4 also delivers a logic "1". If required, the latter case may be separately detected to provide an error signal. The logic "1" from the gate EX4 is applied to the flipflop FF, setting it to the "1" condition, so that the "1" output becomes logic "1". If then the clock CL delivers the signal pulse at its "2" output, the logic AND gate AND receives two "1" signals and delivers a logic "1" to the output register REG, causing the information stored in it to appear at the outputs designated 1, 2, 4 and 8. In addition, the flipflop FF is reset to the "0" condition. The shape of the characters and the disposition of the detectors (shown schematically by their locations in FIG. 4) are such that the information at the outputs of the output register corresponds to the binary code of the digits.

The device shown in FIG. 4 is given as an example only; alternatively a set of five detectors may be provided for each character of, for example, a cash register slip in a shop; in this case also the advantages of the invention are obtained.

What is claimed is:

1. Apparatus for converting into a binary code a visually legible numerical character selected from a closed group of numerical characters, said numerical character being present within a character format area on a support, said apparatus comprising:

a set of exactly four character-identifying sensing elements, each for deriving from a predetermined portion of the character format area, a binary information element;

means for juxtaposing said set of sensing elements in proper alignment with said character format area, said sensing elements sensing and directly converting a machine printable numerical character into a corresponding unique four-bit digital number; and means for converting the group of unique digital numbers corresponding to said closed group of numerical characters into binary digital form;

wherein said character format area includes alignment areas and said apparatus includes an additional sensing element for deriving alignment information;

wherein a fifth sensing element is provided for deriving a fifth binary information element from a fifth predetermined portion within the character format area, said sensing element for supplying a parity determining information signal derived from the said fifth predetermined portion and the shape of the numerical character;

wherein said closed group of numerical characters are the numerals 1, 2, 3, 4, 5, 6, 7, 8, 9, and 0, said four sensing elements being substantially colinear and being consecutively designated 3, 4, 5, and 6, said elements sensing and converting said numerals into four-bit digital numbers in accordance with the following table:

| Numerals | Elements 4 | 5 | 6 | 3 |
|---|---|---|---|---|
| 1 | 0 | 0 | 0 | 1 |
| 2 | 0 | 0 | 1 | 0 |
| 3 | 0 | 0 | 1 | 1 |
| 4 | 0 | 1 | 0 | 0 |
| 5 | 0 | 1 | 0 | 1 |
| 6 | 0 | 1 | 1 | 0 |
| 7 | 0 | 1 | 1 | 1 |
| 8 | 1 | 0 | 0 | 0 |
| 9 | 1 | 0 | 0 | 1 |
| 0 | 0 | 0 | 0 | 0. |

2. The apparatus of claim 1 wherein the location of said fifth element with respect to the shape of the numerals supplies a parity-determining signal in accordance with the following relationship:

| Numerals | 5th Binary Information (Parity) |
|---|---|
| 1 | 0 |
| 2 | 0 |
| 3 | 1 |
| 4 | 0 |
| 5 | 1 |
| 6 | 1 |
| 7 | 0 |
| 8 | 0 |
| 9 | 1 |
| 0 | 1. |

* * * * *